United States Patent [19]

Tymon

[11] Patent Number: 4,707,298
[45] Date of Patent: Nov. 17, 1987

[54] FLOCCED MINERAL MATERIALS AND WATER-RESISTANT ARTICLES MADE THEREFROM

[75] Inventor: Thomas M. Tymon, Lancaster, Pa.

[73] Assignee: Armstrong World Industries, Inc., Lancaster, Pa.

[21] Appl. No.: 829,017

[22] Filed: Feb. 13, 1986

Related U.S. Application Data

[63] Continuation-in-part of Ser. No. 662,057, Oct. 18, 1984, abandoned.

[51] Int. Cl.$^4$ .................. C04B 20/02; C04B 20/06
[52] U.S. Cl. .................. 252/378 R; 252/315.5; 106/DIG. 3; 501/151; 264/110
[58] Field of Search ......... 106/DIG. 3; 252/378 R, 252/315.2, 315.5; 501/12, 151, 153, 154, 36, 95; 264/110, 204; 162/3, 9; 428/446; 277/227; 524/449; 521/35

[56] References Cited

U.S. PATENT DOCUMENTS

| | | | |
|---|---|---|---|
| 3,325,340 | 6/1967 | Walker | 162/3 |
| 3,434,917 | 3/1969 | Kraus et al. | 162/3 |
| 3,597,248 | 8/1971 | Yates | 106/74 |
| 3,830,882 | 8/1974 | Wada | 264/110 |
| 4,219,456 | 8/1980 | Langer | 106/18.14 |
| 4,219,609 | 8/1980 | Cundy | 428/446 |
| 4,239,519 | 12/1980 | Beall et al. | 501/3 |
| 4,454,237 | 6/1984 | Hoda et al. | 501/12 |
| 4,455,382 | 6/1984 | Wu | 501/12 |
| 4,480,060 | 10/1984 | Hoda et al. | 524/449 |
| 4,539,046 | 9/1985 | McAloon et al. | 501/154 |
| 4,557,969 | 12/1985 | Berbner et al. | 428/283 |
| 4,559,264 | 12/1985 | Hoda et al. | 428/454 |

OTHER PUBLICATIONS

Hackh's Chemical Dictionary, 4th edition (1969), p. 413, "Melamine".

*Primary Examiner*—William R. Dixon, Jr.
*Assistant Examiner*—Anthony Green

[57] ABSTRACT

Disclosed are flocced mineral materials which may be utilized to prepare high temperature resistant, water resistant articles. These materials are prepared by utilizing, as a starting material, a gellable layered swelled silicate that has an average charge per structural unit that ranges from about −0.5 to −1 and which contains interstitial cations which promote swelling with a source of at least one species of an exchange cation that is derived from guanidine or compounds closely related thereto.

31 Claims, No Drawings

FLOCCED MINERAL MATERIALS AND WATER-RESISTANT ARTICLES MADE THEREFROM

CROSS-REFERENCE TO RELATED APPLICATION

This application is a continuation-in-part of U.S. application Ser. No. 662,057, filed Oct. 18, 1984 in the name of Thomas M. Tymon, and entitled "Flocced Mineral Materials and Water-Resistant Articles Made Therefrom," now abandoned.

BACKGROUND OF THE INVENTION

It is known that non-asbestos papers and/or sheets may be produced from water-swellable inorganic materials and, in particular, swelled silicate gels. For example, U.S. Pat. No. 4,239,519 is directed to the preparation of inorganic, crystal-containing gellable, water-swelling sheet silicates and certain articles, such as papers, fibers, films, boards, and coatings, produced therefrom. These non-asbestos papers and/or sheets exhibit good high temperature stability and good chemical resistance. Furthermore, since asbestos fibers are not utilized in their manufacture, such articles will not have the health hazards which are associated with asbestos containing articles.

U.S. Pat. No. 4,239,519 teaches the method for making the precursor gellable silicates used to produce said papers or sheet articles, as involving three fundamental steps: (a) a fully or predominantly crystalline body is formed which contains crystals consisting essentially of a lithium and/or sodium waterswelling mica selected from the group of fluorhectorite, hydroxyl hectorite, boron flurophlogopite, hydroxyl boron phlogopite, and solid solutions between those and other structurally compatible species selected from the group of talc, fluortalc, polylithionite, fluorpolylithionite, phlogopite, and fluorphlogopite; (b) that body is contacted with a polar liquid, normally water, to cause swelling and disintegration of the body accompanied with the formation of a gel; and (c) the solid:liquid ratio of the gel is adjusted to a desired value depending upon the application therefor. Glass-ceramics are the preferred crystalline starting bodies. Those products are then contacted with a source of large cations, i.e., with an ionic radius larger than that of the lithium cation, to cause macro flocculation of the gel and an ion exchange reaction to take place between the large cations and the $Li^+$ and/or $Na_+$ ions from the interlayer of the crystals.

Alternatively, U.S. Pat. Nos. 3,325,340 and 3,434,917 teach producing aqueous dispersions of vermiculite flaked crystals which have been caused to swell due to the introduction therein of interstitial ions such as (1) alkylammonium cations having between 3 and 6 carbon atoms inclusive in each carbon group such as methylbutylammonium, n-butylammonium, propylammonium and iso-amylammonium, (2) the cationic form of aminoacids, such as lysine and ornithine, and/or (3) lithium.

While the articles, such as papers, sheets and films, prepared via the prior art processes set forth above exhibit excellent heat resistance and are very useful in a wide variety of applications, it has been discovered that they exhibit a certain amount of water sensitivity which is generally exhibited by the articles having a considerable loss of strength and general deterioration of mechanical and electrical properties when exposed to high humidity environments or submerged in water or other polar liquids. This sensitivity to water correspondingly curtails the utility of these articles in certain applications, such as, for example, head gaskets, electrical insulators, environmental protective coatings, printed wiring boards and washable and environmentally stable building materials.

SUMMARY OF THE INVENTION

It has now been unexpectedly discovered that high temperature, fire-resistant, non-asbestos, waterresistant articles, such as sheet, paper, board, film, fiber and coating articles, can be made from a swelled, layered flocced silicate gel material that is prepared by utilizing an exchange cation that is selected from derivatives of guanidine or closely related compounds thereto. Such articles surprisingly have been found to exhibit, in general, much improved results in tensile strength and puncture resistant tests that are conducted when the articles are wet than do otherwise similar materials that are prepared utilizing prior art exchange cations. Furthermore, the articles made according to the present invention generally display superior electrical and mechanical properties over those materials made by prior art methods.

With reference to heat resistance, the articles that are produced according to the present invention are completely stable to temperatures of approximately 350°-400° C. and maintain their structural stability to approximately 800° C.

DETAILED DESCRIPTION OF THE INVENTION

The articles and the flocced mineral suspensions of the present invention are, in one embodiment of the invention, prepared by utilizing, as a starting material, a water-swelling silicate that has an average charge per structural unit of from about $-0.5$ to about $-1$ and which contains interstitial exchangeable cations that promote swelling. Said starting silicates will include, for example, synthetic and naturally occurring micas, vermiculite, and mixtures thereof. The specific exchange cations in the starting material will depend on the silicate being utilized. For example, if a synthetically derived gellable silicate, which is made, for example, according to the procedures of U.S. Pat. Nos. 4,239,519 or 4,067,819; 4,045,241; or 3,936,383 (which latter three patents discuss, respectively, synthetic tetra-silicic micas, synthetic taeniolites, and a sol of synthetic hectorites), is utilized as a starting material, the exchange cations will generally be $Li^+$ and/or $Na^+$ ions. If a natural vermiculite dispersion, such as made according to U.S. Pat. No. 3,325,340, is utilized, the exchange cations will generally include alkylammonium cations and the other cations specified in U.S. Pat. No. 3,325,340. The silicate, whether synthetic or natural in origin, will generally have morphologies that are represented by thin flakes which are generally disc, strip, and/or ribbons. The flakes will have typical measurements which are from about 500 Å to 100,000 Å, and preferably 5,000 Å to 100,000 Å in length, 500 Å to 100,000 Å in width, and less than 100 Å thick. The term "charge per structural unit" as used in the specification and claims refers to an average charge density as specified by G. Lagaly and A. Weiss, "Determination of Layer Charge in Mica - Type Layer Silicates," Proceedings of International Clay Conference, 61-80

(1969) and G. Lagaly, "Characterization of Clays by Organic Compounds," Clay Minerals, 16, 1–21 (1981).

The starting silicate can be made according to the afore-mentioned procedures of U.S. Pat. Nos. 4,239,519; 3,325,340; or 3,434,917 or other methods which result in dissociated layer silicates with charge densities in the desired ranges. It has been discovered that silicates with charge densities greater than about −0.5 (i.e., from about −0.4 to about 0) will not, when utilized in the present invention, give articles that display good durability. Starting materials with charge densities less that about −1 cannot be used in this invention because of the inability to prepare these materials in disperse form.

The silicate is then contacted with a source of at least one species of cations derived from quanidine or compounds closely related thereto to thereby effect an ion exchange reaction to occur between the cations and the interstitial ions. This ion exchange reaction may be carried out between the cations and the silicate material to thereby form a floc which is then utilized to form the articles of the present invention. In another embodiment of this invention, the starting silicate can be directly formed into a product, such as a lithium fluorhectorite fiber or film by using the procedures of U.S. Pat. No. 4,239,519, and a cationic exchange reaction utilizing the specified cations can be carried out with the product, such as by immersing the product into a solution of said cations. Thus, the ion exchange reaction may be carried out in situ during the actual forming process for the product.

The term "derivatives of guanidine and closely related compounds thereto" is utilized in the specification and claims to refer to compounds, and cations derived therefrom, that contain an aminomethyleneimine group =N—C(—)=N—, and especially an =N—C(—C)-=N— or =N—C(—N)=N— group and resonance structures derived therefrom, in which there is a delocalized double bond. More especially, the cations will have the formula

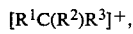

$[R^1C(R^2)R^3]^+$, wherein $R^1$, $R^2$ and $R^3$ are independently selected from $NH_2$ and $CH_3$, provided that at least two of $R^1$, $R^2$ and $R^3$ are $NH_2$, and wherein one or more of the hydrogen atoms on any one or more of $R^1$, $R^2$ and $R^3$ may be replaced by substituents, for example $C_1$ to $C_5$ alkyl, $C_2$ to $C_5$ alkenyl or $C_2$ to $C_5$ alkynyl, and wherein one or more groupings of two of such substituents may be linked to form one or more rings, which may be saturated, unsaturated or aromatic. It will be appreciated that in the cation, there will be a positive charge which may be localized on one group or delocalized, giving a resonance structure, depending on the nature of the compound from which the cation is derived.

Examples of compounds from which the cations may be formed are guanidine, aminoguanidine, diaminoguanidine, methylguanidine, tetramethylguanidine, melamine, 2-aminopyridine and 2,6-diaminopyridine. The compounds may conveniently be used in the form of their hydrochlorides.

The flocced mineral suspensions of the present invention are prepared, for example, by reacting, generally with agitation, a suitable silicate gel with a source of exchange cations derived from the guanadine compounds set forth in the Formula above in order to effect an ion exchange between the guanidine derived cations and the interstitial cations in the silicate gel to form exchanged macro flocculated particles. For example, if the exchange cation of choice is guanidinium or melaminium, the silicate will be reacted with the corresponding hydrochloride or any other corresponding compatible soluble salt.

As stated above, one or more exchange cations that are derived from the Formula above can be utilized in the cationic exchange reaction. Since the various cations will give floc, and eventually end products, with differing physical properties, the specific cation or combination of cations will be chosen by the practitioner of this invention based on the desired end use.

The flocced mineral suspension will be used to form the desired end products. The specific treatment steps applied to the floc will depend on the particular article being formed. For example, if the articles of the present invention are to be formed into sheet materials, the resultant exchanged floc will be agitated with sufficient shear to produce a particle size distribution which leads to suitable particle packing in the sheet forming operation. Following this process the floc is optionally washed to remove any excess salt solution and the consistency of the flocced slurry is adjusted to from about 0.75% to about 2% solids. To promote better drainage rates on a fourdrinier wire, polyelectrolyte flocculating agents can then be added to the slurry at a level of from about 0.1% to about 1%, and preferably 0.2%–0.3% of floc solids. One example of a suitable polyelectrolyte flocculating agent is Polymin P, which is a trademark of BASF Corporation for a polyethylene imine.

This slurry is then fed to a papermaking apparatus where it is dewatered by free drainage and/or vacuum drainage followed by pressing and drying on drum driers. The thus formed sheet material can be used in applications such as gaskets and the like.

If desired, and depending on the intended end use of the product, additional inert materials may be added to the flocced mineral suspension. For example, if desired one or more fibrous materials from the group of natural or synthetic organic fibers or inorganic fibers may be added to the floc to improve its drainage rate and to provide an end product that has improved strength and/or handleability. For example, when the desired end products are gaskets, the fibers of choice are cellulose fibers, glass fibers, and/or Kevlar fibers (Kevlar is a trademark of DuPont Corporation for an aromatic polyamide fiber). In addition, latex or other binders may be added to the floc to provide for a product with improved strength characteristics.

If the cationic exchange reaction is conducted directly on a product formed from the silicate starting material, any desired additional inert materials would be added to the slurry of the silicate starting material prior to the formation of the product and, of course, the subsequent cationic exchange reaction.

The term "water resistant" as used in the specification and claims is not meant to imply that the articles of the present invention are waterproof or are completely impervious to water. By contrast, the term is used to indicate that the materials do not substantially degrade, at least in their tensile strength and puncture resistant properties, when exposed to water.

In these following Examples, unless otherwise specified, the starting material utilized was a lithium fluorhectorite made according to procedures taught in U.S. Pat. No. 4,239,519.

EXAMPLE 1

This example illustrates a method of producing both a guanidinium exchanged fluorhectorite flocced silicate and a formed sheet that was prepared therefrom.

A slurry of guanidinium fluorhectorite was prepared by adding 475 grams of a 10% dispersion of lithium fluorhectorite to 1.4 liters of 1N guanidine hydrochloride solution. The slurry was then agitated with a high shear mixer to reduce the particle size of the resultant floc, was washed and then was analyzed for water content and diluted to result in a 2% solids slurry. The slurry was transferred to a 11.5"×11.5" hand sheet mold (manufactured by Williams Apparatus Co.) and dewatered. The resultant formed sheet was then wet pressed and dried on a drum drier. The sheet had good flexibility and performed well in the gasket sealing test.

EXAMPLE 2

This example illustrates a method of producing films of the present invention wherein the cationic exchange is made in situ.

A 10% solids lithium fluorhectorite gelled dispersion was prepared according to procedures taught in U.S. Pat. No. 4,239,519. A film was made of this material by using a 4.5 mil Byrd applicator, which was 5 inches wide, to draw down a 4½ mil thick wet film of the dispersion on a glass plate. The glass plate, with the film attached, was then immersed in a 0.25M guanidinium hydrochloride solution to cause a cation exchange between the guanidinium cations and the fluorhectorite's interlayer cations. A skin was formed, seemingly instantaneously, on the film which indicated such an exchange was taking place. In 10 minutes the film was removed from the plate, washed in deionized water to remove residual salts, and dried. The film had good flexibility and strength retention when wet.

EXAMPLES 3-9

For each of these examples, the procedure of Example 2 was substantially repeated with the exchange cation as specified to form the corresponding film. In Example 7, a 0.1N solution of melamine hydrochloride was employed. In all the other examples, a 0.25N solution of the respective exchange source was employed:

| Example | Exchange Cation |
| --- | --- |
| 3 | Diaminoguanidine hydrochloride |
| 4 | Aminoguanidine hydrochloride |
| 5 | Tetramethylguanidine hydrochloride |
| 6 | Methylguanidine hydrochloride |
| 7 | Melamine hydrochloride |
| 8 | 2,6-diaminopyridine hydrochloride |
| 9 | 2-aminopyridine hydrochloride |

COMPARATIVE EXAMPLES 1-3

These comparative examples illustrate fluorhectorite films that are made with various prior art exchange cations. Four and one half mil thick films of potassium fluorhectorite (KFH) and ammonium fluorhectorie (NH4FH) were separately prepared by the procedure of Example 2, varying only in the specific exchange cation utilized. A film was then cast of both the KFH and a NH4FH slurry. A Kymene (a trademark of Hercules, Inc. for a cationic, polyamide-epichlorohydrin resin) fluorhectorite film was also prepared by the procedure of Example 2, except that (1) a 3.0% Kymene solution was used and (2) the lithium fluorhectorite film had to be immersed in the Kymene solution for 2 hours until the resultant exchanged film was sufficiently self-supporting to be removed from the glass plate. These films, along with the films made in Examples 2-9, were then subjected to tensile strength and puncture resistance tests which were conducted as follows:

Tensile Strength Measurements

Dry tensile strength measurements were determined using an Instron at 1½" jaw separation and 0.2"/min. crosshead speed. Wet strength measurements were made by bringing water-saturated sponges in contact with both sides of the film sample for 10 seconds while the sample was positioned in the Instron clamps just before the strength test was conducted.

Puncture Resistance Measurements

Sample of film was secured in a retaining device which held the film securely. A stylus which could be loaded was impinged on the film in the direction normal to the surface of the film and loaded with increasing weight until the stylus penetrated the film. In the wet test the film in the retaining device was submerged in deionized water for 10 seconds immediately proceeding the puncture resistance test.

The data from these tests is shown in the table below.

TABLE

| Film of Example # | Exchange Cation | Tensile Strength (psi) Dry | Tensile Strength (psi) Wet | Puncture Resistance (gr/mm) Dry | Puncture Resistance (gr/mm) Wet |
| --- | --- | --- | --- | --- | --- |
| 2 | Guanidinium | 14,000 | 9,000 | 7,100 | 4,600 |
| 3 | Diaminoguanidinium | 13,000 | 11,000 | 14,000 | 4,200 |
| 4 | Aminoguanidinium | 13,000 | 11,000 | 8,900 | 3,500 |
| 5 | Tetramethylguanidinium | 11,000 | 11,000 | 13,000 | 4,400 |
| 6 | Methylguanidinium | 5,200 | 2,800 | 6,600 | 3,400 |
| 7 | Melaminium | 19,000 | 20,000 | 10,000 | 3,300 |
| 8 | 2,6-Diaminopyridine (protonated) | 13,000 | 5,300 | 7,900 | 3,600 |
| 9 | 2-Aminopyridine (protonated) | 11,000 | 7,000 | 7,800 | 3,600 |
| Comparative Example # | | | | | |
| 1 | Kymene (protonated) | 7,000 | 2,700 | 900 | 260 |
| 2 | Ammonium | 3,300 | 1,400 | 3,500 | 680 |

TABLE-continued

| Film of | Exchange Cation | Tensile Strength (psi) | | Puncture Resistance (gr/mm) | |
| --- | --- | --- | --- | --- | --- |
| | | Dry | Wet | Dry | Wet |
| 3 | Potassium | 1,100 | 200 | 3,300 | 440 |

The data indicates that the films made according to the procedures of the present invention have markedly superior wet tensile strength and/or superior wet puncture resistance when compared to prior art compositions.

Fire and Smoke Resistance

A film prepared according to Example 2 was, after being dried, subject to fire and smoke resistant tests in accordance to the procedures specified in ASTM-E-662-79. Three separate tests were made and the results are set forth below. The numerical values correspond to the maximum specified optical density as per N.B.S. Technical Note #708.

| Test # | Flaming DM Corr | Smoldering DM Corr |
| --- | --- | --- |
| 1 | 2 | 0 |
| 2 | 1 | 0 |
| 3 | 1 | 0 |

Electrical Properties

Films of Examples 2 and 7 and Comparative Example 3 were, when dried, tested for dielectric strength using the procedures of ASTM D149. The results are set forth below.

| Films of | Dielectric Strength (v/mil) |
| --- | --- |
| Example 2 | 5,000 |
| Example 7 | 9,000 |
| Comparative Example 3 | 2,920 |

COMPARATIVE EXAMPLES 4 and 5

These examples illustrate using, as a starting material, silicate materials which fall outside the scope of the present invention in their charge per structural unit and their physical measurements.

For comparative Example 4, a 10% aqueous dispersion was made from a natural hectorite obtained from the source clay minerals depository of the Clay Minerals Society, Bloomington, Indiana. For Comparative Example 5, a 10% aqueous dispersion utilizing sodium montmorillonite, which was obtained from the same source. In each example, a film was drawn down using the procedures set forth in Example 2. The glass plates were then immersed for 10 minutes in a 0.25M guanidine hydrochloride solution. In both instances, a coherent film was not produced.

EXAMPLE 10

This example illustrates a method of preparing a film of the present invention utilizing a vermiculite starting material:

A 10% solids suspension of n-butylammonium vermiculite, which was prepared according to the procedures specified in U.S. Pat. No. 3,325,340, was cast as a film on a glass plate according to the procedure set forth in Example 2. The glass plate, with the film attached, was immersed for 10 minutes in a 0.25M guanidinium hydrochloride solution. The resulting film was removed from the plate, washed, and dried. The film displayed wet strength in the tensile strength and puncture resistance tests that a comparable unexchanged vermiculite film does not display.

EXAMPLE 11

This example illustrates preparing fibers utilizing the method of the invention. A 15% solids suspension of lithium fluorhectorite (prepared as above) was extruded through an 11 mil opening needle into a 2N solution of guanidine hydrochloride. The extruded fiber was carried by a porous belt and delivered to a second bath of 2N guanidine hydrochloride. The fiber so produced was washed via submersion in deionized water and dried. The resultant fiber was strong and flexible.

What is claimed is:

1. A method of preparing a flocced mineral material that can be utilized to form a non-asbestos high temperature article that exhibits water resistance which method comprises contacting a swelled layer silicate gel having an average charge per structural unit that ranges from about $-0.5$ to about $-1$ and which contains exchangeable interstitial ions with at least one species of an exchange cation having the formula $[R^1C(R^2)R^3]+$ wherein $R^1$, $R^2$, and $R^3$ are independently selected from $NH_2$ and $CH_3$; provided, however, that at least two or more of $R^1$, $R^2$, and $R^3$ are $NH_2$ but further providing that one or more of the hydrogen atoms of $R^1$, $R^2$, and $R^3$ may instead be a substituent selected from: a $C_1$ to $C_5$ alkyl, a $C_2$ to $C_5$ alkenyl and a $C_2$ to $C_5$ alkynyl wherein these substituents may be linked to form one or more rings which may be saturated, unsaturated or aromatic; to thereby effect an ion exchange reaction between at least some of the exchangeable interstitial ions, and at least some of the exchange cations; further providing that the swelled layer silicate gel was prepared by contacting, for a sufficient time, a water swelling body of (a) vermiculite, (b) mica, or (c) a mixture of vermiculite and mica with a polar liquid to cause swelling of the crystals accompanied with the formation of a gel.

2. A method as described in claim 1 wherein the mica of (b) or (c) is selected from the group consisting of fluorhectorite, hydroxyl hectorite, boron fluorophlogopite, fluorphlogopite, hydroxyl boron phlogopite, and solid solutions between those and other species selected from the group of talc, fluortalc, polylithionite, fluorpolylithionite, phlogopite, and fluorphlogopite.

3. The method of claim 2 wherein the exchange cation is formed from a compound selected from the group consisting of: guanidine, aminoguanidine, diaminoguanidine, methylguanidine, tetramethylguanidine, melamine, 2-aminopyridine and 2,6-diaminopyridine.

4. The method of claim 3 wherein the polar liquid is water.

5. A method as described in claim 1 wherein the mica of (b) or (c) is selected from the group consisting of:

synthetic tetra-silicic mica, synthetic taenolite, and a sol of synthetic hectorite.

6. The method of claim 5 wherein the exchange cation is formed from a compound selected from the group consisting of: guanidine, aminoguanidine, diaminoguanidine, methylguanidine, tetramethylguanidine, melamine, 2-aminopyridine and 2,6-diaminopyridine.

7. The method of claim 6 wherein the polar liquid is water.

8. The method of claim 1 wherein the polar liquid is water.

9. The method of claim 1 wherein the exchange cation is formed from a compound selected from the group consisting of guanidine, aminoguanidine, diaminoguanidine, methylguanidine, tetramethylguanidine, melamine, 2-aminopyridine and 2,6-diaminopyridine.

10. A flocced mineral material which comprises a swelled layered silicate gel that has an average charge per structural unit that ranges from about $-0.5$ to about $-1$, said silicate containing at least some interstitial cations that have the formula $[R^1C(R^2)R^3]+$ wherein $R^1$, $R^2$, and $R^3$ are independently selected from $NH_2$ and $CH_3$; provided, however, that at least two or more of $R^1$, $R^2$, and $R^3$ are $NH_2$ but further providing that one or more of the hydrogen atoms of $R^1$, $R^2$, and $R^3$ may instead be a substituent selected from: a $C_1$ to $C_5$ alkyl, a $C_2$ to $C_5$ alkenyl and a $C_2$ to $C_5$ alkynyl wherein these substituents may be linked to form one or more rings which may be saturated, unsaturated or aromatic; and further, provided that the silicate is a water swelling body of (a) vermiculite, (b) mica, or (c) a mixture of vermiculite and mica.

11. A material as described in claim 10 wherein the mica of (b) or (c) is selected from the group consisting of: fluorhectorite, hydroxyl hectorite, boron fluorophlogopite, fluorophlogopite, hydroxyl boron phlogopite, and solid solutions between those and other species selected from the group of talc, fluortalc, polylithionate, fluorpolylithionite, phlogopite, and fluorphlogopite.

12. The material of claim 11 wherein the interstitial cations are formed from a compound selected from the group consisting of: guanidine, aminoguanidine, diaminoguanidine, methylguanidine, tetramethylguanidine, melamine, 2-aminopyridine and 2,6-diaminopyridine.

13. A material as described in claim 10 wherein the mica of (b) or (c) is selected from the group consisting of: synthetic tetra-silicic mica, synthetic taenolite, and a sol of synthetic hectorite.

14. The material of claim 13 wherein the interstitial cations are formed from a compound selected from the group consisting of: guanidine, aminoguanidine, diaminoguanidine, methylguanidine, tetramethylguanidine, melamine, 2-aminopyridine, and 2,6-diaminopyrindine.

15. The material of claim 13 which has been combined with a fibrous material.

16. The material of claim 10 wherein the interstitial cations are formed from a compound selected from the group consisting of: guanidine, aminoguanidine, diaminoguanidine, methylguanidine, tetramethylguanidine, melamine, 2-aminopyridine, and 2,6-diaminopyridine.

17. The material of claim 16 which has been combined with a fibrous material.

18. The material of claim 10 which has been combined with a fibrous material.

19. The material of claim 18 wherein the interstitial cations are formed from a compound selected from the group consisting of: guanidine, aminoguanidine, diaminoguanidine, methylguanidine, tetramethylguanidine, melamine, 2-aminopyridine, and 2,6-diaminopyridine.

20. The material of claim 10 which has been combined with a fibrous material and shaped into an article.

21. The material of claim 10 which has been formed into an article.

22. A method of preparing a high temperature silicate article that exhibits water resistance, which method comprises contacting an article formed from a swelled layered silicate gel that has a charge per structural unit that ranges from about $-0.5$ to about $-1$, and which contains exchangeable interstitial ions; with a source of at least one species of an exchange cation having the formula $[R^1C(R^2)R^3]+$ wherein $R^1$, $R^2$, and $R^3$ are independently selected from $NH_2$ and $CH_3$; provided, however, that at least two or more of $R^1$, $R^2$, and $R^3$ are $NH_2$ but further providing that one or more of the hydrogen atoms of $R^1$, $R^2$, and $R^3$ may instead be a substituent selected from: a $C_1$ to $C_5$ alkyl, a $C_2$ to $C_5$ alkenyl and a $C_2$ to $C_5$ alkynyl wherein these substituents may be linked to form one or more rings which may be saturated, unsaturated or aromatic; to thereby effect an ion exchange reaction between at least some of the exchangeable interstitial ions and at least some of the exchange cations; further providing that the swelled layered silicate gel was prepared by contacting, for a sufficient time, water swelling body of (a) vermiculite, (b) mica, or (c) a mixture of vermiculite and mica, with a polar liquid to cause swelling of the crystals accompanied with the formation of a gel.

23. A method as described in claim 22 wherein the mica of (b) or (c) is selected from the group consisting of: fluorhectorite, hydroxyl hectorite, boron fluorophlogopite, fluorphlogopite, hydroxyl boron phlogopite, and solid solutions between those and other species selected from the group of talc, fluortalc, polylithionite, fluorpolylithionite, phlogopite, and fluorphlogopite.

24. The method of claim 23 wherein the exchange cation is formed from a compound selected from the group consisting of: guanidine, aminoguanidine, diaminoguanidine, methylguanidine, tetramethylguanidine, melamine, 2-aminopyridine and 2,6-diaminopyridine.

25. The method of claim 23 wherein the polar liquid is water.

26. A method as described in claim 22 wherein the mica of (b) or (c) is selected from the group consisting of: synthetic tetra-silicic mica, synthetic taenolite, and a sol of synthetic hectorite.

27. The method of claim 26 wherein the exchange cation is formed from a compound selected from the group consisting of: guanidine, aminoguanidine, diaminoguanidine, methylguanidine, tetramethylguanidine, melamine, 2-aminopyridine and 2,6-diaminopyridine.

28. The method of claim 26 wherein the polar liquid is water.

29. The method of claim 22 wherein the exchange cation is formed from a compound selected from the group consisting of: guanidine, aminoguanidine, diaminoguanidine, methylguanidine, tetramethylguanidine, melamine, 2-aminopyridine and 2,6-diaminopyridine.

30. The method of claim 29 wherein the polar liquid is water.

31. The method of claim 22 wherein the polar liquid is water.

* * * * *